Patented May 19, 1925.

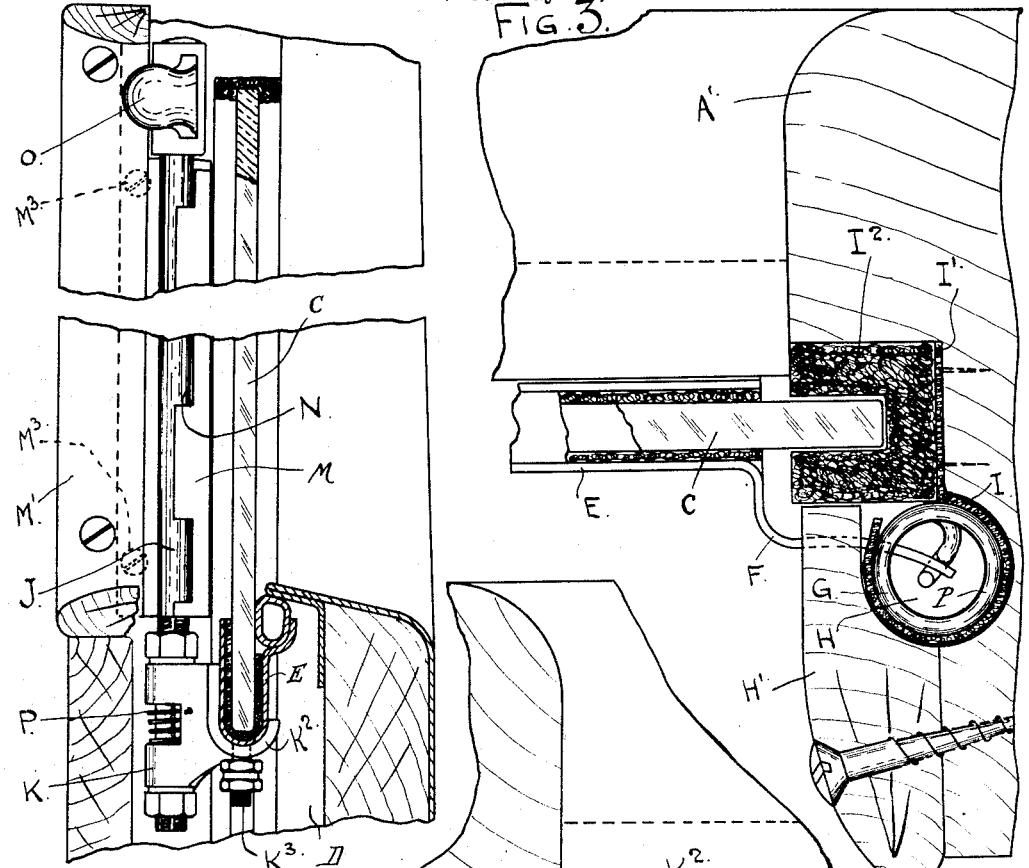
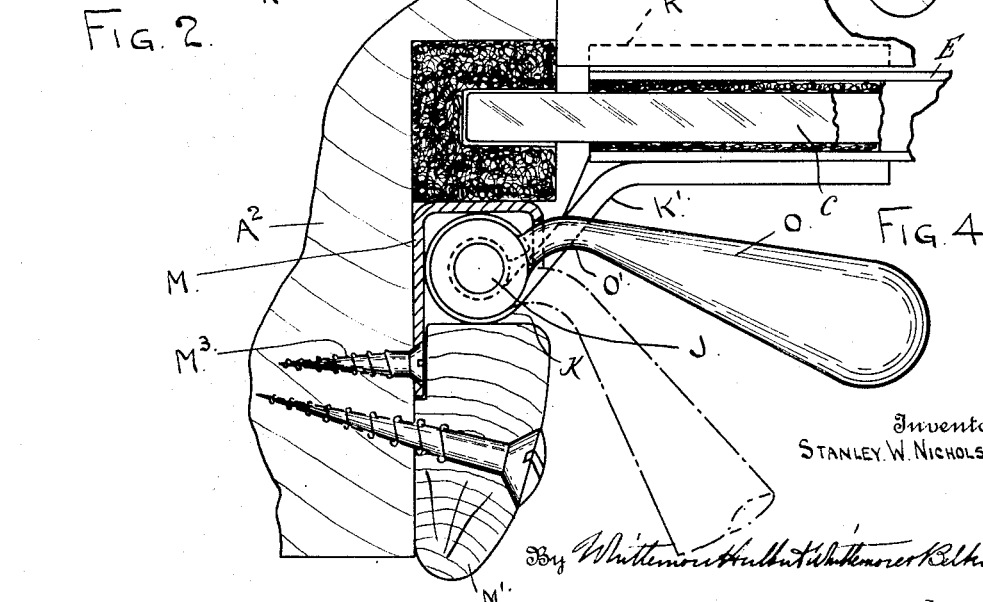

1,538,444

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW-CONTROL MECHANISM.

Application filed May 22, 1922. Serial No. 562,869.

*To all whom it may concern:*

Be it known that I, STANLEY W. NICHOLSON, a citizen of the United States of America, residing at Toledo, in the county of Lucas and State of Ohio, have invented certain new and useful Improvements in Window-Control Mechanism, of which the following is a specification, reference being had therein to the accompanying drawings.

This invention relates to window control mechanism and more particularly to control mechanism for the sliding windows of vehicles.

The invention consists in the structural features and arrangement of parts hereinafter described.

In the drawings:—

Figure 2 is a vertical section on line 2—2 of Figure 1 showing details of the control means;

Figure 3 is a cross section on line 3—3 of Figure 1 showing the mounting of the counterbalance spring;

Figure 4 is a cross section through the control rod taken on line 4—4 of Figure 1.

Figure 1:
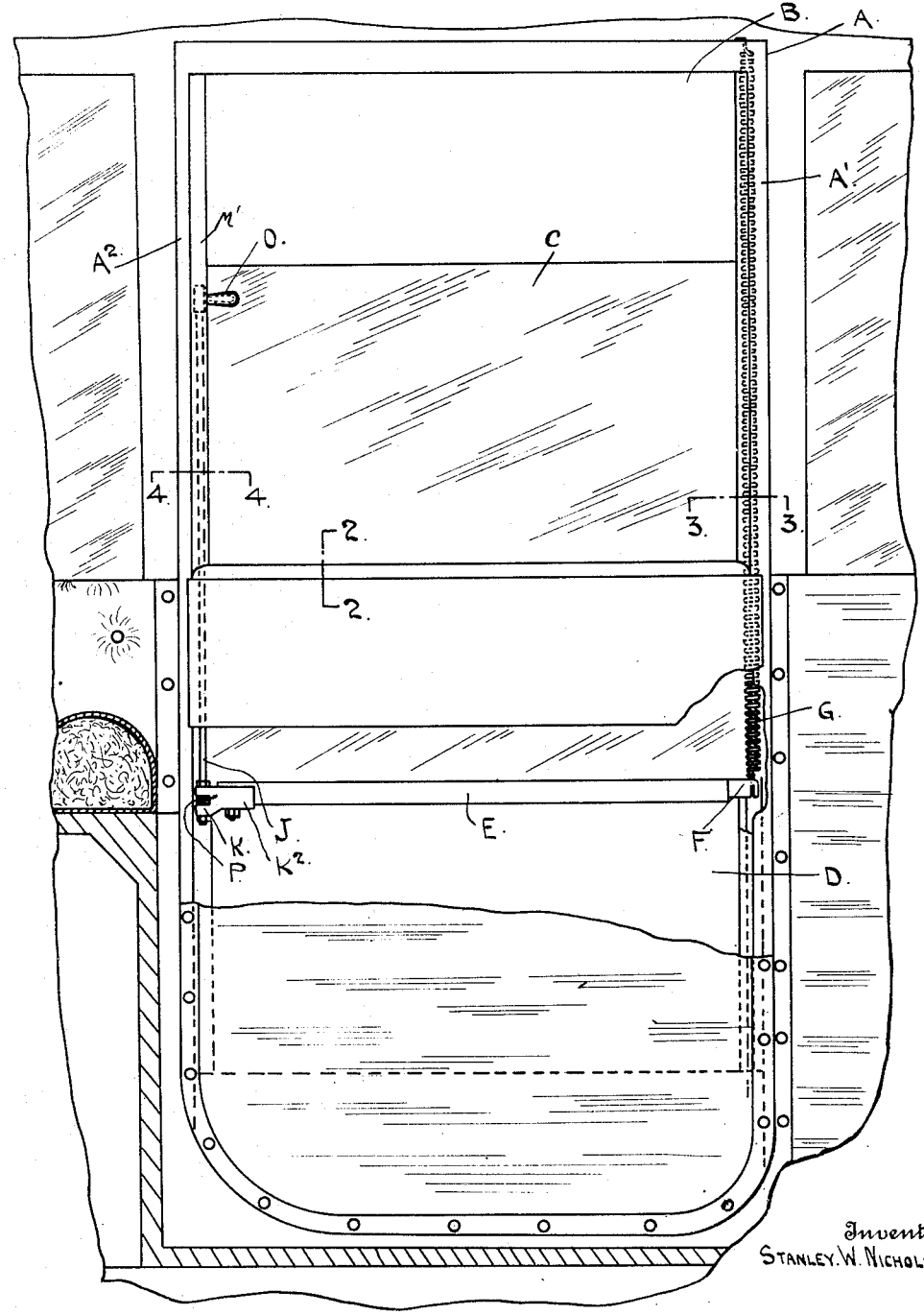
Figure 1 is an interior view of an automobile door equipped with the improved control mechanism.

In these views the reference character A designates an automobile door having in its upper portion a window opening B and provided with a closure for said opening having the nature of a vertically slidable glass plate C which in lowered position is adapted to enter a chamber or well D formed in the lower portion of said door. As is common practice, the bottom edge of the plate C is embraced by a channel shaped sheet metal strip E, and at one extremity said strip is formed with a laterally projecting integral tongue F. Said tongue provides for attachment to the plate C of the lower extremity of the coiled counter-balance spring G which is arranged at one side of the window opening B and is secured at its upper end to the top of the door A. Said spring is disposed within a tubular chamber H jointly formed in one of the uprights A' of the door and in the complementary trim stick H'. For the prevention of rattle it is preferred to line the tubular chamber H with a felt strip I having the portion I tacked or otherwise secured to the upright A' in back of the felt slideway $I^2$ for the plate C. Adjacent the other upright $A^2$ of the door A there is vertically extended a control rod J having its lower end portion journalled in a bearing K formed integral with a bracket K' which is secured in any suitable manner to the adjacent end of the channel strip E. As shown the bracket K' has a U-shaped securing portion $K^2$ which embraces the strip E and is rigidly connected to the latter by a stud bolt $K^3$. The rod J extends within a housing jointly formed by a sheet metal strip M having a J-shape in cross section and by the adjacent trim stick M'. The long flange of the strip M seats against the upright $A^2$ and is secured thereto, as indicated at $M^3$ and the short flange of said strip is notched at suitable intervals, as indicated at N, adapting said flange to function as a stationary latch member. Upon the upper extremity of the rod J there is mounted fast a handle O for subjecting said rod to an upward or downward thrust to raise or lower the closure C and for furthermore rocking said rod to control engagement with the stationary latch member N of a coacting latch element carried by said rod. Preferably this element, as shown, is formed by a reduced neck portion O' of the handle O which portion is selectively engageable with the notches N to retain the closure in any desired position. A spring P coiled upon the lower end portion of the rod J exercises a rotative effort upon the rod tending to swing the handle O toward the closure C, as shown in full lines in Figure 4, this being the position in which the latch element O' engages in one of the notches N. By exerting a slight manual effort the handle O may be swung outwardly to the dash line position, shown in Figure 4, releasing the element O' from the latch plate and permitting vertically shifting of the closure C.

It is a feature of the described construction that the counterbalance means and closure actuating means are arranged adjacent opposite edges of the closure and are both substantially concealed. It is a further feature that the trim stick upon the two door uprights are each given a secondary use in forming the elongated openings wherein the control rod and counterbalance spring are disposed. The fact that the spring G transmits its pull to the closure C without any intermediary levers and in a direction parallel to the travel of the closure permits the necessary counterbalancing effort to be derived from a spring of minimum strength.

It is to be observed that the points of engagement of the spring used in the described construction are relatively remote even in the closed or upper-most position of the sliding window member. This permits use of a spring comprising a large number of coils and which will exercise the necessary effort more uniformly in all positions of the window member than would be possible with a spring of lesser contracted length.

What I claim as my invention is:—

1. In a window, a vertically sliding closure and a control rod and counter-balancing coil spring for said closure attached to the latter adjacent the lower edge thereof and respectively vertically extended adjacent the opposed edges of said closure.

2. In a window, a member having a window opening, a closure for said opening slidably carried by said member, and a control rod and a counter-balancing coil spring for said closure arranged adjacent opposite edges of said opening and means upon said edges for substantially concealing said rod and spring.

3. In a window, a member having a window opening, a sliding closure for said opening, a trim stick extended upon said member adjacent one margin of said opening, said trim stick jointly forming with said member a tubular chamber, and a counterbalance spring for said closure disposed within said chamber.

4. The combination with a sliding window closure, of an elongated coiled counterbalance spring for said closure, and a tubular fibrous anti-rattler packing around said spring and in close proximity thereto.

5. In a window, a sliding closure, an elongated control rod attached thereto and extended in the direction of movement of said closure, a stationary latch member partially forming a housing for said rod, a coacting latch member carried by the rod, and a trim stick coacting with said stationary latch member to house said rod.

6. In a window, a closure mounted for substantially vertical sliding movement, an actuating device having its point of engagement with the closure close adjacent one side edge thereof, and a counter-balance spring engaging said closure close adjacent the other edge thereof.

7. In a window, a frame having a window opening, a vertically sliding closure for said opening, and actuating, latching, and counterbalancing means for said closure substantially registered vertically with said opening in the closed position of the closure.

8. In a window a member having a window opening, a sliding closure for said opening, and a control rod and a counterbalance spring for said closure extended in the direction of travel of said closure respectively adjacent opposite edges of said opening.

9. In a window a member having a window opening, a sliding closure for said opening, a trim stick extended upon said member at one side of said opening interiorly of the window, and a coiled counter-balanced spring for said closure concealed by said trim stick.

10. In a window a member having a window opening, a sliding closure for said opening, a counter-balance spring for said closure, and a trim stick extended upon an edge of said member marginal to said opening concealing said spring and having a portion cut away to accommodate the spring.

In testimony whereof I affix my signature.

STANLEY W. NICHOLSON.